United States Patent [19]

Sau

[11] Patent Number: 5,574,127
[45] Date of Patent: Nov. 12, 1996

[54] HYDROPHOBICALLY MODIFIED POLY(ACETAL-POLYETHERS)

[75] Inventor: Arjun C. Sau, Newark, Del.

[73] Assignee: Aqualon, Wilmington, Del.

[21] Appl. No.: 417,368

[22] Filed: Apr. 5, 1995

[51] Int. Cl.[6] .................................................. C08G 8/02
[52] U.S. Cl. ........................... 528/125; 524/876; 525/50; 525/429; 525/459
[58] Field of Search ........................... 524/876; 525/429, 525/459, 50; 528/125

[56] References Cited

U.S. PATENT DOCUMENTS 3,862,100  1/1975  Halasa et al. ........................... 526/181
3,997,613  12/1976  Lenke et al. ........................... 568/45
4,052,370  10/1977  Halasa et al. ........................... 528/75

*Primary Examiner*—Shelley Dodson
*Attorney, Agent, or Firm*—David Edwards

[57] ABSTRACT

Associative thickeners of the present invention are water soluble polymer compositions that have a backbone of poly(acetal- or ketal-polyether) with ends that are capped with hydrophobic groups. They are prepared by copolymerizing an alpha, omega-diol, -di,thiol or-diamino polyether with a gem-dihalide compound in the presence of a base to form an alpha, omega-diol, -dithiol or -diamino poly(acetal- or ketal-polyether) which in turn is reacted with hydrophobic reagents to form the final product. These associative thickeners are used in film forming coating compositions, such as latex paints.

38 Claims, No Drawings

HYDROPHOBICALLY MODIFIED POLY(ACETAL-POLYETHERS)

FIELD OF THE INVENTION

This invention relates to synthetic nonionic hydrophobically-modified water-soluble polyethers with the ability to viscosify water-based systems.

BACKGROUND OF THE INVENTION

Water-soluble polymers (also commonly referred to as "thickeners" or "rheology modifiers") are widely used in many industrial water-borne systems as additives to modify their flow behavior. Thickeners increase and maintain viscosity at required levels under specified processing conditions and end use situations. Thickeners are useful, for example, in decorative and protective coatings, paper coatings, cosmetics and personal care items, detergents, pharmaceuticals, adhesives and sealants, agricultural formulations, and petroleum drilling fluids.

One such highly filled aqueous system where the thickener is used in a decorative and protective coating is latex paint, which is composed of a dispersion of a polymeric latex, pigments, clays, and other additives in water.

Thickeners can be materials that are either naturally occurring or synthetically manufactured. Natural thickeners, for example, include casein, alginates, gum tragacanth, guar, xanthan gum, locust bean gum, and modified celluloses, such as hydroxyethylcellulose, hydroxypropylcellulose, and carboxymethylcellulose. These natural products vary in their thickening efficiency. One of the drawbacks of natural product based thickeners is that they are subject to microbial attack and hence, addition of antimicrobial agents to the formulation is required. Synthetic thickeners include various acrylic polymers, alkylene oxide polymers, amide polymers, and maleic anhydride polymers. These synthetic thickeners can be either homopolymers or copolymers. The hydrolytic stability of some of these polymers depends on the pH of the solution and others are sensitive to various components normally found in aqueous coatings.

Regardless of whether the thickener is natural or synthetic, it is desirable that it be water-soluble to have optimal properties as a thickener in various water-based systems. The term "water-soluble polymer" refers to any polymeric substance which is soluble in water and, by being soluble, produces a change in solution viscosity, refractive index, or surface tension of water.

Typically, a small amount (about 0.1–5 wt. %) of water-soluble polymers is added to latex paints to achieve the following performance characteristics during manufacturing, storage, and applications:

a) Ease of formulation, b) Prevention of settling of the suspended particles (latex, pigment, etc.) during storage, c) Good film build during applications to achieve efficient hiding without excessive brush or roller drag, d) Good roller spatter resistance, e) No excessive sagging after application on a vertical surface, and f) Good flow and leveling for the formation of a smooth and continuous film with good appearance.

The above mentioned natural and synthetic thickeners provide different degrees of thickening efficiency and application properties. However, they invariably fail to provide all of the key performance properties in gloss paints. These key properties include good film build, flow and leveling, and gloss which are generally offered by solvent-based alkyd paints. Another drawback of these thickeners is that they may have poor compatibility with the various paint ingredients.

To eliminate some of the performance deficiencies of conventional thickeners, a new class of thickeners, commonly referred to as "associative thickeners", has been designed and commercialized (See E. J. Schaller and P. R. Sperry, in "Handbook of Coatings Additives", Ed. L. J. Calbo, Vol. 2, p: 105, 1992; Marcel Dekker, Inc., New York). These thickeners are hydrophobically-modified water-soluble polymers. They undergo intermolecular association in aqueous solution and thereby exhibit enhanced solution viscosity. They can also adsorb onto the dispersed-phase particles of an aqueous dispersion and thereby form a three-dimensional network. Since they provide improved paint properties not offered by conventional thickeners, they have gained commercial importance.

Polysaccharide based associative thickeners are made by chemically grafting a small amount of a hydrophobic group ($C_{10}$–$C_{24}$ alkyl) onto a modified polysaccharide. They are disclosed in U.S. Pat. Nos. 4,228,277, 4,243,802, and EP 281,360.

Among commercial nonionic synthetic associative thickeners, hydrophobically modified ethoxylated urethane (HEUR) block copolymers constitute an important class. They are disclosed in U.S. Pat. Nos. 4,079,028, 4,155,892, and 5,281,654. These are low molecular weight polyurethanes made by condensing relatively low molecular weight polyethylene glycol (molecular weight~10,000) with hydrophobic diisocyanates and end-capping the resulting copolymer with hydrophobic alcohols or amines. They are characterized by having three or more hydrophobes—two of which are terminal and the remainder are internal. The hydrophobic groups are connected to the hydrophilic polyethylene oxide blocks through-urethane linkages.

The preparation of HEURs is also disclosed in U.S. Pat. Nos. 4,499,233 and 5,023,309. These HEURs are claimed to provide superior viscosifying properties and improved flow and leveling in aqueous systems.

Processes for the production of HEURs with pendant hydrophobes in bunches are described in U.S. Pat. Nos. 4,426,485 and 4,496,708. These HEURs are believed to lo provide enhanced thickening to aqueous systems through micelle-like association.

HEURs with branched structure and terminal hydrophobes are disclosed in U.S. Pat. No. 4,327,008. They are made by reacting polyalkylene oxides with a polyfunctional material, a diisocyanate, and water and end-capping the resulting product with a hydrophobic monofunctional active hydrogen-containing compound or a monoisocyanate.

Silicon-containing HEURs having particular utility in paints and coatings are disclosed in European Patent Application 0 498,442 A1. These are reaction products of an isocyanate functional material, a polyether polyol, a monofunctional active hydrogen-containing hydrophobic compound, a silane-functional material, and water.

From applications and economic point of view, the major drawbacks of HEUR thickeners are their high cost, difficulty in handling, and tendency to destabilize the paint (separation of dispersed particles from the aqueous phase) (G. D. Shay and A. F. Rich, J. Coatings Technology, Vol. 58, No. 7, p.43, 1986).

Random copolymers of ethylene oxide and long chain alkyl epoxides are disclosed in U.S. Pat. No. 4,304,902.

These copolymers provide enhanced aqueous viscosity, but do not provide good flow and leveling in latex paints.

U.S. Pat. No. 4,411,819 describes the preparation of polyethers which have branched chain structure and are characterized by having terminal hydrophobes. They are made by reacting a low molecular weight polyol with a mixture of ethylene oxide and at least one lower alkylene oxide having 3–4 carbon atoms. The polyethers are then end-capped with a mixture of $C_{12}$–$C_{18}$ alpha-olefin epoxides.

Low molecular weight (~9,000) hydrophobically end-capped polyether is disclosed in PCT Int. Appl. WO 92 08753. These are made by coupling low molecular weight (~4,500) surfactant with m-dichloromethylbenzene. Preparation of low molecular weight (~9,000) hydrophobically end-capped polyethers is also disclosed in U.S. Pat. No. 5,045,230. These are made by reacting $C_8$–$C_{22}$ aliphatic alcohols with a mixture of ethylene oxide and propylene oxide and subsequently coupling the alkoxylated alcohols with a diepoxide to form a polyether (MW~9,000). Since these hydrophobically end-capped polyethers are of low molecular weight, they do not efficiently viscosify aqueous systems including latex paints.

Latex compositions containing low molecular weight (3,000–20,000) water-soluble polyethers bearing terminal hydrophobes were disclosed in U.S. Pat. No. 3,770,684. They were claimed to provide improved leveling in latex paints. However, these polyethers were not efficient in increasing the viscosity of water and did not provide other rheological properties demanded in various highly filled aqueous systems. Hence, they were not versatile and economical.

Commercial nonionic synthetic associative thickeners exhibit often poor and variable compatibility in paints, as exemplified by syneresis, poor color acceptance, variable paint viscosity over time, and inadequate hiding power. A need exists in the paint industry for a nonionic synthetic associative thickener that corrects these deficiencies at a cost-effective dosage level. No single thickener is known that provides all the desired performance characteristics required in water-borne coatings. Hence, very often, attempts are made to use blends of two or more different thickeners to achieve the targeted coating rheology. While this approach works in a limited way, blending of thickeners is often cumbersome and depending on mutual interactions between the individual thickener, the stability and performance of the coatings are often in jeopardy.

SUMMARY OF THE INVENTION

The present invention relates to a water-soluble copolymer composition comprising a backbone of acetal- or ketal-linked polyether which has ends that are capped with hydrophobic groups.

The present invention is also directed to a process for preparing a hydrophobically end-capped poly(acetal- or ketal-polyether) comprising a) reacting an alpha, omega-dihydroxy polyether with a gem-dihalide compound in the presence of a base to form an alpha, omega-dihydroxy poly[acetal- or ketal-polyether] backbone, and b) reacting the backbone with a hydrophobic reagent to form the hydrophobically end-capped poly(acetal- or ketal-polyether).

The present invention further relates to a film forming, coating composition comprising an aqueous solution of the hydrophobically end-capped poly[acetal- or ketal-polyether] composition mentioned above.

DETAILED DESCRIPTION OF THE INVENTION

The polymers of the present invention have been found to efficiently thicken various water-based systems including latex paints and provide an improved combination of paint properties (stability, flow and leveling, film build, spatter resistance, and sag resistance).

"Flow and leveling" as used in this invention refers to the degree to which a coating flows out after application so as to obliterate any surface irregularities such as, for example, brush marks, an "orange peel" appearance, peaks, or craters, which are produced by the mechanical process of applying a coating.

"Film build" means the formation of a continuous film to uniformly cover the surface of the substrate that is being coated.

"Spatter resistance" means the ability of the coating formulation to resist the formation of flying tiny droplets during application of the coating.

"Stability" means the ability to maintain the viscosity upon aging and to prevent phase separation.

"Sagging", as used herein, refers to the downward movement of a coating on a vertical surface between the time of application and setting, resulting in an uneven coating having a thick bottom edge. The resulting sag is usually restricted to a local area of a vertical surface and may have the characteristic appearance of a draped curtain. Sagging is aesthetically undesirable. In addition, coatings that resist the tendency to sag will not easily drip off a paint brush or a paint roller and will not easily drip off a horizontal surface, such as for example, a ceiling.

According to the invention, the water-Soluble polymer backbone can be a preformed high molecular weight polyether, such as a polyalkylene glycol (also known as polyalkylene oxide) bearing terminal —OH groups. High molecular weight polyethylene glycols (molecular weight 17,000 and 35,000) are available from Fluka Chemical Corporation, Ronkonkoma, N.Y. Alternatively, a desired high molecular weight polyether precursor can be made in situ by condensing low molecular weight polyethers with a coupling agent, such as a gem-dihalogeno reagent or a mixture of gem-dihalogeno reagents as shown below. Various grades of low molecular weight polyethylene glycols (MW~4,000–8000) are available from Union Carbide marketed under the trademark Carbowax.

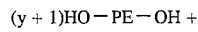

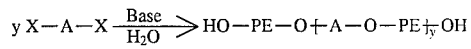

where PE is a polyether; A is a moiety separating the halogen atoms (X). groups of the PE can also be —SH and —NH2 groups.

Note that if X-A-X is a geminal dihalogeno-reagent, then the polyether blocks are connected through acetal or ketal linkages which are stable in alkaline environments.

So far as the type of terminal hydrophobe, R, is concerned, the polyether could bear either the same or different hydrophobes at its termini.

The hydrophobically-modified polyether can be made by reacting the terminal —OH, —SH, or —NH2 groups of the polyether with an appropriate hydrophobic reagent in the presence of a base in an organic solvent.

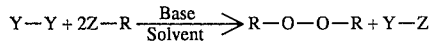

where, - - - is the water-soluble polyether backbone, Z is a functional group capable of reacting with the terminal Y (Y=—OH, —SH and —NH2) groups of the polyether, and R is a hydrophobic group.

To carry out the process, any solvent or solvent mixtures devoid of active hydrogens and stable to bases could be used. However, tetrahydrofuran, alkyl ethers of alkylene glycols or hydrocarbon solvents are preferred. Notwithstanding the above, the process can also be carried out in the absence of a solvent.

The polymer composition of the present invention has the following formula

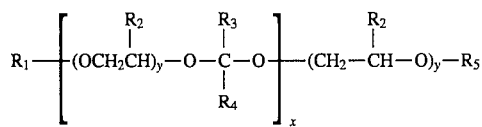

where:

$R_1$ and $R_5$ are independently selected from the group consisting of a hydrophobic group or H. The hydrophobic groups can be either the same or different in the same molecule and are selected from hydrocarbyl, alkyl, aryl, arylalkyl, cycloaliphatic, perfluoroalkyl, carbosilyl, polycyclic groups, and complex dendritic hydrophobes. The preferred hydrophobic group is alkyl with a carbon range of 8–22 carbons, most preferred being 12–18 carbons. These hydrophobic groups can be either saturated or unsaturated, branched or linear; the upper limit of the number of carbon atoms in the hydrophobic groups is 40 carbons, preferably 27 carbons, and more preferably 22 carbons; the lower limit of the number of carbon atoms in the hydrophobic groups is 1 carbon, preferably 4 carbons, more preferably 8 carbons. Specific examples of the hydrophobic groups are octyl, dodecyl, hexadecyl, and octodecyl groups.

When the hydrophobic groups are independently selected from alkyl, perfluoroalkyl and carbosilyl, the carbon range is from 1 to 40 carbons. When the hydrophobic groups are aryl, arylalkyl, cycloaliphatic, and polycyclic groups, the carbon range is 3 to 40 with the preferred range being from 6 to 29 carbons, and most preferred range being 14 to 25 carbons.

$R_2$ is selected from the group consisting of H, alkyl groups having 1–3 carbons, or a combination thereof;

$R_3$ and $R_4$ are independently selected from the group consisting of H, alkyl groups of 1–6 carbons, and phenyl;

y is an integer having values from about 1 to about 500; and x is an integer having values from about 1 to about 50.

The composition of the present invention has a poly(acetal- or ketal-polyether) backbone that is either linear or branched, with the linear one being preferred. The polyethers that can be used in this invention include any water-soluble polyalkylene oxide or copolymers of polyalkylene oxides; the preferred polyether backbone is polyethylene oxide or water-soluble copolymers of ethylene oxide with another comonomer such as propylene oxide and butylene oxide.

The weight average molecular weight of the copolymer has an upper limit of 2,000,000, preferably 500,000, and most preferably 100,000. The lower limit of the molecular weight of the polymer is 500, preferably 15,000, and most preferably 20,000.

According to the present invention, a wide variety of hydrophobically end-capped poly(acetal- or ketal- polyethers) could be made by appropriately selecting various reaction conditions and manipulating the stoichiometry and molecular weight of the reactants.

Generally, any gem-dihalide can be used in the process for preparing the poly(acetal- or ketal-polyether) of the instant invention. However, dihalogenomethanes, such as dibromomethane and dichloromethane are preferred. Examples of other dihalides include: 1,1-dichlorotoluene ($C_6H_5CHCl_2$), 1,1-dichloroethane ($CH_3CHCl_2$) and 1,1-dibromoethane ($CH_3CHBr_2$). When a solvent is used, any solvent devoid of active hydrogens can be used in the process of this invention with oxygenated hydrocarbon solvents bearing 2 to 30 carbons are preferred. Examples of solvents that can be used in the instant invention are: toluene, xylene, aliphatic hydrocarbons, dialkyl ethers of alkylene glycols and diethoxymethane. Any strong base capable of reacting with the terminal active hydrogens of the poly(acetalor ketalpolyether) to form poly(acetal- or ketal-polyether) dianion, could be used in the process. Examples of bases that can be used in this invention are alkali metal hydrides, alkali metal hydroxides, alkali metal carbonates, and organic bases.

The preferred process of making hydrophobically end-capped poly(acetalpolyethers) comprises mixing molten polyether with caustic at elevated temperatures, followed by copolymerizing the polyether with a gem-dihalide, and subsequently endcapping the poly(acetal-polyether) with a hydrophobic reagent.

In accordance with this invention, the hydrophobically end-capped poly(acetalor ketal-polyether) compositions can be used in film forming coating compositions such as latex paints, the pigment volume concentration (PVC) of the latex paint can have a lower limit of 5, preferably 10 and an upper limit of 85, preferably 80. More particularly, when the latex paint is a high gloss paint, the PVC is from about 15 to about 30; when the paint is a semi-gloss paint, the PVC is from about 20 to about 35; and when it is a flat paint, the PVC is from about 40 to about 80. Also, for latex paints the ICI viscosity should be above about 1.5 Pa.s at 25° C. for good performance.

The following examples illustrate the preparation of hydrophobe end-capped poly(acetal-polyethers) of the present invention. However, they should not be construed as the only ones limiting the invention, as other process variations are possible.

EXAMPLE 1

Preparation of PEG-8000/Methylene Copolymer

To a three-necked round-bottomed flask (1000 ml) equipped with a Dean-Stark separator (at the top of which was attached a condenser whose top was connected to a nitrogen source), magnetic stirrer, and thermometer were added polyethylene glycol (MW~8000) (PEG-8000) (45 g) and toluene (100 ml). Moisture from PEG-8000 was azeotropically removed by distilling out toluene. The residual toluene, which could not be distilled out of the reaction flask at atmospheric pressure, was removed by passing a stream of nitrogen over the viscous solution of PEG-8000 and keeping one of the necks of the reaction flask open. Then the flask containing dry PEG-8000 was cooled to room temperature and the Dean-Stark separator removed.

To the dry PEG-8000 at room temperature were added dry (HPLC grade) tetrahydrofuran (THF) (650 ml) and sodium hydride dispersion (60% in mineral oil) (0.85 g). The resulting reaction mixture was heated under reflux for 0.5 hour.

Following this, a solution of dibromomethane (0.98 g) in THF (50 ml) was added dropwise to the PEG-8000/NaH reaction mixture over a period of 2 hours under nitrogen atmosphere through an addition funnel. The resulting reaction mixture was heated under reflux for 24 hours. After evaporation of solvent, a fluffy white solid was isolated.

The weight average molecular weight of the PEG-8000/methylene copolymer was 53,000 with polydispersity index of 1.94. It was soluble in water to form a clear solution.

EXAMPLE 2

Preparation of $C_{18}$ End-Capped PEG-8000/Methylene Copolymer in Tetrahydrofuran (THF)

The PEG-8000/methylene copolymer (described in Example 1) (13 g) was dried by dissolving it in boiling toluene (60 ml) and azeotropically distilling out toluene from the polymer solution. This "dry" PEG-8000/methylene copolymer was heated under reflux with sodium hydride dispersion (60% in mineral oil) (0.25 g) and 1-bromooctadecane (0.5 g) in THF (150 ml) for 22 hours under nitrogen atmosphere. After evaporation of solvent from the reaction mixture, a tan solid was isolated.

The $C_{18}$ end-capped PEG-8000/methylene copolymer thus obtained was soluble in water (2% solution BF viscosity at 30 rpm~1080 cps). The $C_{18}$ hydrophobe content of the product was 1.42%.

EXAMPLE 3

Preparation of $C_{18}$ End-Capped PEG-8000/Methylene Copolymer Using Dichloromethane To a three-necked round-bottomed flask (500 ml) equipped with a Dean-Stark separator (at the top of which was attached a condenser whose top was connected to a nitrogen source), magnetic stirrer, and thermometer were added PEG-8000 (18 g) and toluene (70 ml). Moisture from PEG-8000 was azeotropically removed by distilling out toluene. The residual toluene, which could not be distilled out of the reaction flask at atmospheric pressure, was removed by passing a stream of nitrogen over the viscous solution of PEG-8000 and keeping one of the necks of the reaction flask open. Then the flask containing dry PEG-8000 was cooled to room temperature and the Dean-Stark separator removed.

To the dry PEG-8000 at room temperature were added dry (HPLC grade) tetrahydrofuran (THF) (170 ml) and sodium hydride dispersion (60% in mineral oil) (0.4 g). The resulting reaction mixture was heated under reflux for 1.5 hour.

Following this, dichloromethane (0.15 g) was added to the PEG-8000/NaH reaction mixture and the resulting reaction mixture under reflux for 18 hours to form the PEG-8000/methylene copolymer. Then sodium hydride (60% dispersion in mineral oil) (0.3 g) and 1-bromooctadecane were added to the reaction mixture containing the PEG-8000/methylene copolymer. After heating the resulting mixture under reflux for 8 hours, it was cooled to room temperature and transferred into a plastic tray. After evaporation of solvent inside the hood, a slightly brown solid was isolated.

The weight average molecular weight of the $C_{18}$ end-capped PEG8000/methylene copolymer was 31,947 with polydispersity index of 1.91. It was soluble in water to form a clear solution (2% solution BF viscosity at 30 rpm~1780 cps). The octadecyl ($C_{18}H_{37}$) content of the polymer was 2.02 wt %.

EXAMPLE 4

Preparation of $C_{12}/C_{16}$ Mixed End-Capped PEG-8000/Methylene Copolymer To a stainless steel pressure reactor (Chemco type) were added PEG-8000 (750 g), THF (750 ml) and sodium hydride (60% dispersion in mineral oil) (22 g). After sealing the reactor, the resulting mixture was heated at 80° C. for 1 hour and then cooled to 40° C. Following this, dibromomethane (13 g) was added to the reaction mixture at ° C. and the resulting reaction mixture heated at 80° C. for 4 hours.

To this reaction mixture at 80° C. was added a mixture of 1-bromododecane (8 g) and 1-bromohexadecane (15 g). The resulting reaction mixture was heated at 120° C. 1for hours, cooled to room temperature and the reactor charge transferred into a plastic tray. After evaporation of solvent, a buff solid was isolated.

The $C_{12}/C_{16}$ mixed end-capped PEG-8000/methylene copolymer thus formed was soluble in water (2% solution BF viscosity at 30 rpm~60 cps).

EXAMPLE 5

Preparation of $C_{16}$ End-Capped PEG-8000/Methylene Copolymer

The procedure described in Example 4 was repeated using the following reagents.
1. PEG—8000–750 g,
2. Tetrahydrofuran—750 ml,
3. Sodium hydride (60% dispersion in mineral oil)—22 g and
4. Dibromomethane—11 g, and
5. 1-Bromohexadecane (Fluka; 97% pure)—42 g The $C_{16}$ end-capped PEG-8000/methylene copolymer was soluble in water (2% solution BF viscosity at 30 rpm~590 cps). The cetyl ($C_{16}H_{33}$) content of the copolymer was 1.52 wt %.

EXAMPLE 6

Preparation of $C_{16}$ End-Capped PEG-8000/Methylene Copolymer in Dipropylene Glycol Dimethyl Ether Example 5 was repeated using Proglyde® DMM dipropylene glycol dimethyl ether (Dow Chemical) as the reaction solvent.

The $C_{16}$ end-capped PEG-8000/methylene copolymer was soluble in water solution BF viscosity at 30 rpm~120 cps).

EXAMPLE 7

Preparation of $C_{16}$ End-Capped PEG-8000/Methylene Copolymer in Diethoxymethane Example 5 was repeated using diethoxymethane (Eastman Chemical) as the reaction solvent.

The $C_{16}$ end-capped PEG-8000/methylene copolymer was soluble in water (2% solution BF viscosity at 30 rpm~720 cps).

EXAMPLE 8

Preparation of $C_{16}$ End-Capped PEG-8000/Jeffamine®ED-6000/Methylene Terpolymer in THF A PEG-8000/Jeffamine® ED-6000/methylene Terpolymer was made by copolymerizing PEG-8000 (600 g), Jeffamine® ED-6000 (a polyoxyalkylene amine available from Huntsman Corporation) (150 g) and dibromomethane (12 g) in the presence of sodium hydride (60% dispersion; 22 g) in tetrahydrofuran (750 ml) according to the procedure described in Example 4. This Terpolymer was then reacted in situ with 1-bromohexadecane (42 g) at 120° C. for 2 hours. After evaporation of solvent, a fluffy solid was isolated.

The $C_{16}$ end-capped PEG-8000/Jeffamine® ED-6000/methylene copolymer was soluble in water (2% solution BF viscosity at 30 rpm~300 cps). The cetyl ($C_{16}H_{33}$) content of the copolymer was 0.95 wt %.

EXAMPLE 9

Preparation of $C_{18}$ End-Capped EMKAROX HV 105 Polyalkylene Glycol/Methylene Copolymer Example 2 was repeated using the following reagents.
a. EMKAROX HV 19 Polyalkylene glycol (nominal molecular weight~20,000; available from ICI Americas)—18 g
b. Toluene—100 ml
c. THF—170 ml
d. Sodium hydride (60% dispersion)—0.5 g
e. Dibromomethane—0.2 g
f. 1-Bromooctadecane—1.0 g.

The 2% solution BF viscosity of the $C_{18}$ end-capped EMKAROX HV 105 polyalkylene glycol/methylene copolymer was 140 cps.

Paint Properties Of Hydrophobe End-Capped Polyethers

The following Examples illustrate the thickeners of the present invention being incorporated into a vinyl-acrylic latex (UCAR 367 or POLYCO 2161) based flat paint (pigment volume concentration=60%) and an all-acrylic (Rhoplex AC-417 or 417M) semigloss paint (pigment volume concentration=24%) to achieve an initial Stormer viscosity of 90–95 Kreb Units. The ingredients used in the vinyl-acrylic flat and the all-acrylic semigloss paint are shown in Table 1 and 2 respectively. The significance and scale of various paint properties are as follows:

a) Stormer viscosity (initial and after overnight storage) is measured by a Stormer viscometer at 200 sec$^{-1}$ shear rate and expressed in Kreb Units (KU).

b) ICI viscosity is measured by an ICI plate and cone viscometer at 12,000 sec$^{-1}$ and expressed in poise.

c) Thickening efficiency (TE) measured as dry wt % thickener needed in the paint to achieve the initial Stormer viscosity.

d) Leveling by Leneta method (measured on a scale of 0–10; O=worst and 10=best).

e) Sag resistance by Leneta method, mid-range bar, wet film thickness (WFT) (in mils) above which sag occurs.

f) Spatter resistance by roll-out over a black panel (compared on a scale of O-10; O=worst and 10=best).

g) 60° Gloss is specular gloss viewed at 600.

TABLE 1

Interior Flat White and Light Tint Base

| Materials | Pounds | Gallons |
|---|---|---|
| Water | 200.0 | 24.00 |
| Dispersant (Potassium tripolyphosphate) | 2.0 | 0.10 |
| Ross & Rowe 551 | 2.0 | 0.23 |
| Dispersant (Tamol 731) | 5.0 | 0.56 |
| Defoamer (Hercules SGL defoamer) | 2.0 | 0.27 |
| Ethylene glycol | 20.0 | 2.18 |
| Carbitol acetate | 10.0 | 1.19 |
| Titanium dioxide (Ti-Pure ® R-901) | 175.0 | 5.12 |
| Calcium carbonate (Camel CARB) | 150.0 | 6.64 |
| Iceberg Clay | 125.0 | 5.74 |
| 1160 silica | 25.0 | 1.13 |

Grind to a Hegman of 4 and let-down at slower speed as follows:

| Materials | Pounds | Gallons |
|---|---|---|
| Ephoxylated nonylphenol (Makon 10) | 3.0 | 0.34 |
| Vinyl-acrylic latex (Polyco 2161) | 200.0 | 22.00 |
| Biocide (Proxel GXL) | 1.0 | 0.11 |
| Water and/or thickener solution | 250.5 | 30.07 |
| Total | 1170.5 | 99.68 |

Formula Constants

| | |
|---|---|
| Weight/gallon, lbs. | 11.74 |
| Pigment Volume Concentrration, % | 62.7 |
| Nonvolatile Volume, % | 31.3 |
| Nonvolatile Weight, % | 49.9 |
| Stormer Viscosity, KU (Initial) | 95 ± 2 |

TABLE 2

Interior White Semigloss

| Materials | Pounds | Gallons |
|---|---|---|
| Propylene glycol | 80.0 | 9.30 |
| Dispersant (Tamol ® SG-1) | 8.5 | 0.89 |
| Defoamer (Hercules SGL defoamer) | 2.0 | 0.26 |
| Titanium dioxide (Ti-Pure ® R-900 | 240.0 | 7.03 |
| Silica (Imsil A-15) | 25.0 | 1.13 |

Grind to a Hegman of 7+ and let-down at slower speed as follows:

| Materials | Pounds | Gallons |
|---|---|---|
| Acrylic latex emulsion (Rhoplex AC-417M) (48% solids) | 500.0 | 56.00 |
| Antifoaming agent (Hercules SGL defoamer) | 2.7 | 0.37 |
| Propylene glycol | 10.0 | 1.16 |
| Biocide (Proxel GXL) | 1.0 | 0.11 |
| Coalescent (Texanol ®) | 21.6 | 2.73 |
| Anionic surfactant (Triton GR-7M Premix) | 0.5 | 0.06 |
| Water | 20.8 | 2.50 |
| Water and/or thickener solution | 153.7 | 18.46 |
| Total | 1065.8 | 100.00 |

TABLE 2-continued

Formula Constants

| | |
|---|---|
| Weight/gallon, lbs. | 10.66 |
| Pigment Volume Concentration, % | 24.8 |
| Nonvolatile Volume, % | 32.9 |
| Nonvolatile Weight, % | 48.0 |
| Stormer Viscosity, KU (Initial) | 90 ± 2 |
| Gloss 60° | 40 ± 5 |

EXAMPLES 10–27

Preparation of Various Hydrophobe End-Capped PEG-8000/Methylene Copolymers

Following the procedures described in Examples 1 and 2, a series of hydrophobe end-capped PEG-8000/methylene copolymers with different molecular weights (17,000–150,000) and bearing various amounts of different hydrophobes ($C_{16}$–$C_{22}$) were made by varying the amount of appropriate regents and reaction conditions.

The solution viscosity of a given hydrophobe end-capped polyether depended on its molecular weight, hydrophobe type, and the hydrophobe content.

The paint properties of various thickeners with different compositions are given in Tables 3 and 4. All of the molecular weights (indicated in Tables 3 and 4) refer to the weight average molecular weight of the sample.

Procedures for Determining the Weight Average Molecular Weight of Poly(acetal-polyethers)

The weight average molecular weights of poly(acetal-polyethers) were measured by size exclusion chromatography (SEC). The SEC measurements were performed in a 0.20M lithium acetate buffer (pH 4.8) plus 0.5% β-cyclodextrin plus 0.1% N-methyl pyrrolidone (NMP) mobile phase with both the columns and the refractive index detector thermosrated at 40° C. The polymers were chromatographed through a set of four Shodex PROTEIN® columns (2 KW-802.5+1 KW-803+1 KW-804) in series at a flow rate of 1.0 ml/min. A sample concentration of 0.20% was used with an injection volume of 200 liters. The molecular weight distribution data are based on polyethylene oxide/polyethylene glycol standards and are not absolute.

TABLE 3

ALL-ACRYLIC (RHOPLEX AC-417M) SEMIGLOSS PAINT PROPERTIES OF END-CAPPED METHYLENE/PEG-8000 COPOLYMERS

| Examples | Hydrophobe | $M_w \times 10^{-3}$ | Viscosity (2%) (cps) | TE (%) | KU | ICI | Level | Sag | Spatter | 60° Gloss |
|---|---|---|---|---|---|---|---|---|---|---|
| 10 | $C_{18}$ | 62 | 3560 | 0.29 | 93/105 | 0.9 | 10 | 6 | 9 | 51.6 |
| 11 | $C_{18}$ | 53 | 3800 | 0.33 | 90/104 | 1.0 | 10 | 6 | 8 | 51.7 |
| 12 | $C_{18}$ | 53 | 2120 | 0.36 | 90/101 | 1.1 | 9 | 8 | 7 | 55.6 |
| 13 | $C_{18}$ | 74 | 600 | 0.55 | 89/105 | 1.5 | 10 | 6 | 9 | 53.1 |
| 14 | $C_{18}$ | 109 | 1720 | 0.29 | 88/102 | 1.1 | 10 | 6 | 9 | 50.9 |
| 15 | $C_{18}$ | 67 | 1720 | 0.39 | 88/106 | 1.1 | 10 | 6 | 7 | 54.9 |
| 16 | $C_{18}$ | 71 | 4100 | 0.24 | 90/103 | 0.9 | 9 | 8 | 7 | 55.8 |
| 17 | $C_{18}$ | 74 | 4100 | 0.29 | 92/109 | 1.0 | 10 | 8 | 8 | 58.2 |
| 18 | $C_{18}$ | 59 | 3000 | 0.31 | 90/107 | 1.0 | 10 | 8 | 8 | 58.2 |
| 19 | $C_{18}$ | 57 | 2000 | 0.36 | 91/101 | 1.1 | 9 | 8 | 7 | 55.6 |
| 20 | $C_{18}$ | 56 | 1000 | 0.73 | 93/116 | 1.9 | 10 | 6 | 9 | 54.8 |
| 21 | $C_{18}$ | 78 | 410 | 0.47 | 88/101 | 1.9 | 9 | 8 | 9 | 54.2 |
| 22 | $C_{16}$ | 72 | 420 | 0.43 | 90/102 | 1.8 | 10 | 8 | 9 | 51.6 |
| 23 | $C_{16}$ | 53 | 280 | 0.58 | 90/102 | 1.8 | 10 | 8 | 9 | 51.6 |
| 24 | $C_{16}$ | 67 | 220 | 0.65 | 90/113 | 2.2 | 10 | 8 | 8 | 51.3 |
| 25 | $C_{16}$ | 48 | 180 | 0.73 | 90/106 | 2.4 | 10 | 8 | 8 | 51.3 |
| 26 | $C_{16}$ | 61 | 120 | 0.73 | 91/113 | 2.5 | 10 | 6 | 9 | 51.0 |
| 27 | $C_{16}$ | 35 | 30 | 1.16 | 90/101 | 2.7 | 10 | 6 | 8 | 55.4 |

TABLE 4

Vinyl-Acrylic (UCAR 367) Flat Paint Properties of End-Capped Methylene/ PEG-8000 Copolymers

| Example | Hydrophobe | $M_w \times 10^{-3}$ | Viscosity (2%) (cps) | TE (%) | KU | ICI | Level | Sag | Spatter |
|---|---|---|---|---|---|---|---|---|---|
| 10 | $C_{18}$ | 62 | 3560 | 0.45 | 97/104 | 1.5 | 8 | 12 | 9 |
| 11 | $C_{18}$ | 53 | 3800 | 0.51 | 96/104 | 1.8 | 10 | 9 | 9 |
| 12 | $C_{18}$ | 53 | 2120 | 0.54 | 94/101 | 1.5 | 7 | 11 | 7 |
| 13 | $C_{18}$ | 74 | 600 | 0.98 | 95/110 | 2.3 | 8 | 12 | 9 |
| 14 | $C_{18}$ | 109 | 1720 | 0.81 | 97/108 | 1.9 | 8 | 12 | 9 |
| 15 | $C_{18}$ | 67 | 1720 | 0.63 | 93/106 | 1.6 | 7 | 10 | 8 |
| 16 | $C_{18}$ | 71 | 4100 | 0.48 | 96/109 | 1.5 | 8 | 8 | 8 |
| 17 | $C_{18}$ | 74 | 4100 | 0.47 | 96/112 | 1.5 | 7 | 8 | 8 |
| 18 | $C_{18}$ | 59 | 3000 | 0.50 | 93/106 | 1.3 | 7 | 8 | 8 |

TABLE 4-continued

Vinyl-Acrylic (UCAR 367) Flat Paint Properties of End-Capped Methylene/
PEG-8000 Copolymers

| Example | Hydrophobe | $M_w \times 10^{-3}$ | Viscosity (2%) (cps) | TE (%) | KU | ICI | Level | Sag | Spatter |
|---------|------------|----------------------|----------------------|--------|--------|-----|-------|-----|---------|
| 19 | $C_{18}$ | 57 | 2000 | 0.55 | 94/102 | 1.4 | 8 | 11 | 7 |
| 20 | $C_{18}$ | 56 | 1000 | 0.89 | 97/113 | 2.2 | 8 | 12 | 9 |
| 21 | $C_{18}$ | 78 | 410 | 0.82 | 94/102 | 1.7 | 7 | 12 | 9 |
| 22 | $C_{16}$ | 72 | 420 | 0.62 | 93/107 | 2.8 | 8 | 10 | 8 |
| 23 | $C_{16}$ | 53 | 280 | 0.64 | 93/102 | 2.9 | 8 | 9 | 8 |
| 24 | $C_{16}$ | 67 | 220 | 0.75 | 94/109 | 3.0 | 8 | 10 | 9 |
| 25 | $C_{16}$ | 48 | 180 | 0.82 | 96/110 | 3.3 | 7 | 12 | 7 |
| 26 | $C_{16}$ | 61 | 120 | 0.86 | 97/115 | 3.5 | 8 | 11 | 9 |

As can be seen, the paint properties are controlled by the molecular weight, hydrophobe type and solution viscosity. The paint data clearly show that by appropriately adjusting these molecular parameters, one can achieve a balance of paint properties.

EXAMPLE 28

Preparation of $C_{16}$ End-Capped
PEG-8000/Methylene Copolymer in a Solvent-Free
Process Using Sodium Hydroxide as the Base To an Abbe ribbon blender were added PEG-8000 (1250 g) and sodium hydroxide (37 g). After sealing the reactor, the mixture was heated at 80° C. for one hour. Then dibromomethane (18.5 g) was added to the PEG-8000/NaOH mixture and the resulting reaction mixture heated at 80° C. for 4 hours to form the PEG-8000/methylene copolymer.

To the PEG-8000/methylene copolymer at 80° C. was added 1-bromohexadecane (65 g) and the resulting reaction mixture was heated at 120° C. for 2 hours. Following this, the reactor was opened and the molten reaction mixture poured into a plastic tray. Upon cooling to room temperature, the reaction mixture solidified.

The crude reaction mixture was soluble in water (2% solution BF viscosity at 30 rpm–410 cps).

EXAMPLE 29

Preparation of $C_{16}$ End-Capped
PEG-8000/Methylene Copolymer in a Solvent-Free
Process Using Sodium Hydroxide as the Base With
Shorter Reaction Time To an Abbe ribbon blender were added PEG-8000 (1250 g) and sodium hydroxide (37 g). After sealing the reactor, the mixture was heated at 80° C. for 1 hour. Then dibromomethane (18.5 g) was added to the PEG-8000/NaOH mixture and the resulting reaction mixture heated at 100° C. for 2 hours to form the PEG-8000/methylene copolymer.

To the PEG-8000/methylene copolymer at 100° C. was added 1-bromohexadecane (65 g) and the resulting reaction mixture heated at 120° C. for 2 hours. Following this, the reactor was opened and the molten reaction mixture poured into a plastic tray. Upon cooling to room temperature, the reaction mixture solidified.

The crude reaction mixture was soluble in water (2% solution BF viscosity at 30 rpm–410 cps).

EXAMPLE 30

Preparation of $C_{16}$ End-Capped
PEG-8000/Methylene Copolymer in a Solvent-Free
Process Using Sodium Hydroxide as the Base Example 28 was repeated using less sodium hydroxide. The reagents used were:
a. PEG-8000–1250 g
b. Sodium hydroxide—25 g
c. Dibromomethane—18.5 g
d. 1-Bromohexadecane—65 g The crude reaction mixture was soluble in water (2% solution BF viscosity at 30 rpm–60 cps).

EXAMPLE 31

Preparation of $C_{16}$ End-Capped
PEG-8000/Methylene Copolymer in a Solvent-Free
Process Using Sodium Hydride as the Base Example 28 was repeated using the following reagents.
a. PEG-8000–1250 g
b. Sodium hydride (60% dispersion in mineral oil)—36.5 g
c. Dibromomethane—18.5 g
d. 1-Bromohexadecane—70 g The crude reaction mixture was soluble in water (2% solution BF viscosity at 30 rpm–620 cps).

EXAMPLE 32

Preparation of $C_{12}$ End-Capped
PEG-8000/Methylene Copolymer in a Solvent-Free
Process Using Sodium Hydroxide as the Base Example 28 was repeated using the following reagents.
a. PEG-8000–1250 g
b. Sodium hydroxide—37 g
c. Dibromomethane—17 g
d. 1-Bromododecane—83 g The crude reaction mixture was soluble in water (20% solution BF viscosity at 30 rpm–4400 cps). The dodecyl ($C_{12}H_{25}$) content of the copolymer was 1.75 wt %.

EXAMPLE 33

Preparation of $C_{12}/C_{16}$ Mixed End-Capped
PEG-8000/Methylene Copolymer in a Solvent-Free
Process Using Sodium Hydroxide as the Base Example 28 was repeated using a mixture of 1-bromododecane and 1-bromohexadecane as the end-capping agents. The reagents used were:

a. PEG-8000–1250 g
b. Sodium hydroxide—37 g
c. Dibromomethane—18.5 g
d. 1-Bromododecane—20 g
e. 1-Bromohexadecane—60 g The crude reaction mixture was soluble in water (2% solution BF viscosity at 30 rpm~165 cps).

EXAMPLE 34

Preparation of Nonylphenyl/$C_{16}$ Mixed End-Capped PEG/Methylene Copolymer in a Solvent-Free Process Using Sodium Hydroxide as the Base Example 28 was repeated using a mixture of PEG-8000 and ethoxylated nonylphenol, $C_9H_{19}$–$C_6H_4$–O(CH$_2$CH$_{20}$)40-H (IGEPAL CO-890; available from GAF Corporation) as the polyethylene glycol substrates. The other reagents used are shown below:
a. PEG-8000–1250 g
b. IGEPAL CO-890–25 g
c. Sodium Hydroxide—37 g
d. Dibromomethane—18.5 g
e. 1-Bromohexadecane—60 g The crude reaction mixture was soluble in water (2% solution BF viscosity at 30 rpm–195 cps.

Effect of the Degree of Hydrophobe End-Capping on the Paint Properties of Poly(Acetal-Polyethers)

It was surprising to find that the degree of hydrophobe end-capping, i.e., the fraction of chain ends capped with a hydrophobe, of the poly(acetal-polyether) of a given molecular weight dramatically affected its key paint properties (thickening efficiency, ICI viscosity, leveling, and spatter resistance). This is exemplified by comparing paint properties of various poly(acetal-polyethers) of identical molecular weight (weight average molecular weight~31,000) prepared according to the procedure described in Example 28 but containing different degrees $C_{16}$-capping (see data in Table 5).

TABLE 5

Rhoplex AC-417M Semigloss Paint Properties of $C_{16}$ End-Capped Poly(Acetal-Polyethers) (MW~31000) with Different Levels of $C_{16}$ Hydrophobe

| Samples | $C_{16}$ Content (wt %) | TE (%) | KU | ICI | Level | Sag | Spatter | 60° Gloss |
|---|---|---|---|---|---|---|---|---|
| a | 1.45 | 0.73 | 91/105 | 2.0 | 10 | 9 | 9 | 47.0 |
| b | 1.90 | 0.51 | 90/104 | 1.6 | 9 | 8 | 9 | 45.8 |
| c | 2.00 | 0.30 | 88/96 | 1.0 | 6 | 9 | 8 | 47.5 |
| d | 2.28 | 0.32 | 90/105 | 1.1 | 6 | 12 | 9 | 46.4 |

The data in Table 5 show that the best balance of paint properties is achieved at an intermediate level of hydrophobe content of about 1.9 wt. % corresponding to a degree of end-capping of about 70%. Lower hydrophobe weight percents provide poor thickening efficiency and higher levels lead to poor leveling and lower ICI viscosity. The optimum degree of end-capping to achieve a balance of paint properties would vary with molecular weight of the poly(acetal-polyether).

What is claimed:

1. A water-soluble polymer composition comprising a backbone of poly(acetal- or ketal-polyether) which has ends that are capped with hydrophobic groups independently selected from the group consisting of alkyl, aryl, arylalkyl, cycloaliphatic, perfluoroalkyl, carbosilyl, polycyclyl, and complex dendritic groups wherein the alkyl, perfluoroalkyl, and carbosilyl hydrophobic groups comprise 1 to 40 carbons.

2. The polymer composition of claim 1 wherein the aryl, arylalkyl, cycloaliphatic, and polycyclic hydrophobic groups comprise 3 to 40 carbons.

3. The polymer composition of claim 3 wherein the hydrophobic group is an alkyl group of 8 to 22 carbons.

4. The polymer composition of claim 3 wherein the hydrophobic group is an alkyl of 12 to 18 carbons.

5. The polymer composition of claim 2 wherein the hydrophobic group is selected from the group consisting of aryl, arylalkyl, cycloaliphatic and polycyclic of 6 to 29 carbons.

6. The polymer composition of claim 5 wherein the hydrophobic group is selected from the group consisting of aryl, arylalkyl, cycloaliphatic and polycyclic of 14 to 25 carbons.

7. The polymer composition of claim 1, wherein the upper limit of the weight average molecular weight of the polymer is about 2,000,000.

8. The polymer composition of claim 1 wherein the upper limit of the weight average molecular weight is about 500,000.

9. The polymer composition of claim 1 wherein the upper limit of the weight average molecular weight is about 100,000.

10. The polymer composition of claim 1 wherein the lower limit of the weight average molecular weight is about 500.

11. The polymer composition of claim 1, wherein the lower limit of the weight average molecular weight of the polymer is about 15,000.

12. The polymer composition of claim 1 wherein the lower limit of the weight average molecular weight is about 20,000.

13. A polymer composition having the following formula

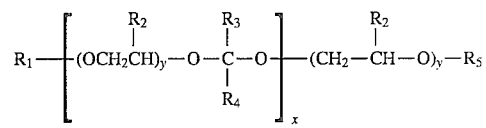

where $R_1$ and $R_5$ are independently selected from the group consisting of a hydrophobic group having 1 to 40 carbons or H, $R_2$ is selected from the group consisting of H, alkyl having 1–3 carbons, or a combination thereof, $R_3$ and $R_4$ are independently selected from the group consisting of H, alkyl of 1–6 carbons, and phenyl, y is an integer of from about 5 to about 500, and x is an integer of from about 1 to about 50.

14. The polymer composition of claim 13 wherein $R_2$ is H.

15. The polymer composition of claim 13 wherein $R_2$ is an alkyl having 1 to 2 carbons.

16. The polymer composition of claim 13 wherein $R_3$ and $R_4$ are both H.

17. The polymer composition of claim 14 wherein $R_3$ and $R_4$ are alkyl groups having 1 to 2 carbons.

18. The polymer composition of claim 13 wherein y is about 180.

19. The polymer composition of claim 13 wherein y is about 100.

20. The polymer composition of claim 13 wherein x is about 15.

21. The polymer composition of claim 13 wherein x is about 5.

22. A process for preparing a hydrophobically end-capped poly(acetal- or ketal-polyether) comprising a) copolymerizing an alpha, omega-dihydroxy, -dithiol or -diamino polyether or a mixture of them with a gem-dihalide compound in the presence of a base for a sufficient time to form an alpha, omega-dihydroxy poly(acetal- or ketal- polyether) backbone, and b) reacting the backbone with a hydrophobic reagent for a sufficient time to form the hydrophobically end capped poly (acetal- or ketal- polyether).

23. The process of claim 22 wherein the hydrophobic groups are independently selected from the group consisting of alkyl, aryl, arylalkyl, cycloaliphatic, perfluoroalkyl, carbosilyl, polycyclyl, and dendritic groups.

24. The process of claim 23, wherein the alkyl, perfluoroalkyl, and carbosilyl hydrophobic groups comprise 1 to 40 carbons.

25. The process of claim 23 wherein the aryl, arylalkyl, cycloaliphatic, and polycyclic hydrophobic groups comprise 3 to 40 carbons.

26. The process of claim 24 wherein the hydrophobic group is an alkyl of 8 to 22 carbons.

27. The polymer composition of claim 26 wherein the hydrophobic group is an alkyl of 12 to 18 carbons.

28. The process of claim 25 wherein the hydrophobic group is selected from the group consisting of aryl, arylalkyl, cycloaliphatic, polycyclic, and dendritic of 6 to 29 carbons.

29. The process of claim 28 wherein the hydrophobic group is selected from the group consisting of aryl, arylalkyl, cycloaliphatic and polycyclic of 14 to 25 carbons.

30. The process of claim 22, wherein the upper limit of the weight average molecular weight of the polymer is about 2,000,000.

31. The process of claim 22 wherein the upper limit of the weight average molecular weight is about 500,000.

32. The process of claim 22 wherein the upper limit of the weight average molecular weight is about 100,000.

33. The process of claim 22 wherein the lower limit of the weight average molecular weight is about 500.

34. The process of claim 22, wherein the lower limit of the molecular weight of the polymer is about 15,000.

35. The process of claim 22 wherein the lower limit of the molecular weight is about 20,000.

36. A film forming coating composition comprising the hydrophobically end capped poly(acetal- or ketal-polyether) composition of claim 1.

37. The film forming coating composition of claim 36 wherein the composition is a latex paint.

38. The film forming coating composition of claim 32 wherein the latex paint has a pigment volume concentration of from about 15 to about 80.

* * * * *

UNITED STATES PATENT AND TRADEMARK OFFICE
CERTIFICATE OF CORRECTION

PATENT NO. : 5,574,127

DATED : November 11, 1996

INVENTOR(S) : Arjun C. Sau

It is certified that error appears in the above-identified patent and that said Letters Patent is hereby corrected as shown below:

Column 4, line 58, insert before "groups" --The terminal--.

Column 5, line 8, "NH2" should be --$NH_2$--.

Column 6, line 28, after "(acetal" insert -- - --.

Column 7, line 63, after "copolymer" make a new paragraph.

Column 8, line 22, before "°C" insert --40--.

Column 8, line 26, replace "1" with --2--.

Column 9, line 25, underline "in situ".

Column 10, line 11, replace "600" with --60°--.

Column 12, line 18, replace "thermosrated" with --thermostated--.

Column 13, line 56, delete "he".

Column 15, line 16, replace "$CH_{20}$" with --$CH_2O$--.

Claim 3, line 1, replace "3" with "1".

Claim 34, line 2, before "molecular" insert --weight average--.

Claim 35, line 2, before "molecular" insert --weight average--.

UNITED STATES PATENT AND TRADEMARK OFFICE
CERTIFICATE OF CORRECTION

PATENT NO. : 5,574,127
DATED : November 11, 1996
INVENTOR(S) : Arjun C. Sau It is certified that error appears in the above-identified patent and that said Letters Patent is hereby corrected as shown below:

Claim 38, line 1, replace "32" with --37--.

Signed and Sealed this

Twenty-fifth Day of March, 1997

Attest:

BRUCE LEHMAN

Attesting Officer

Commissioner of Patents and Trademarks